March 30, 1943.   F. M. SALISBURY ET AL   2,315,483
ADJUSTING UNIT
Filed April 28, 1939   2 Sheets-Sheet 1
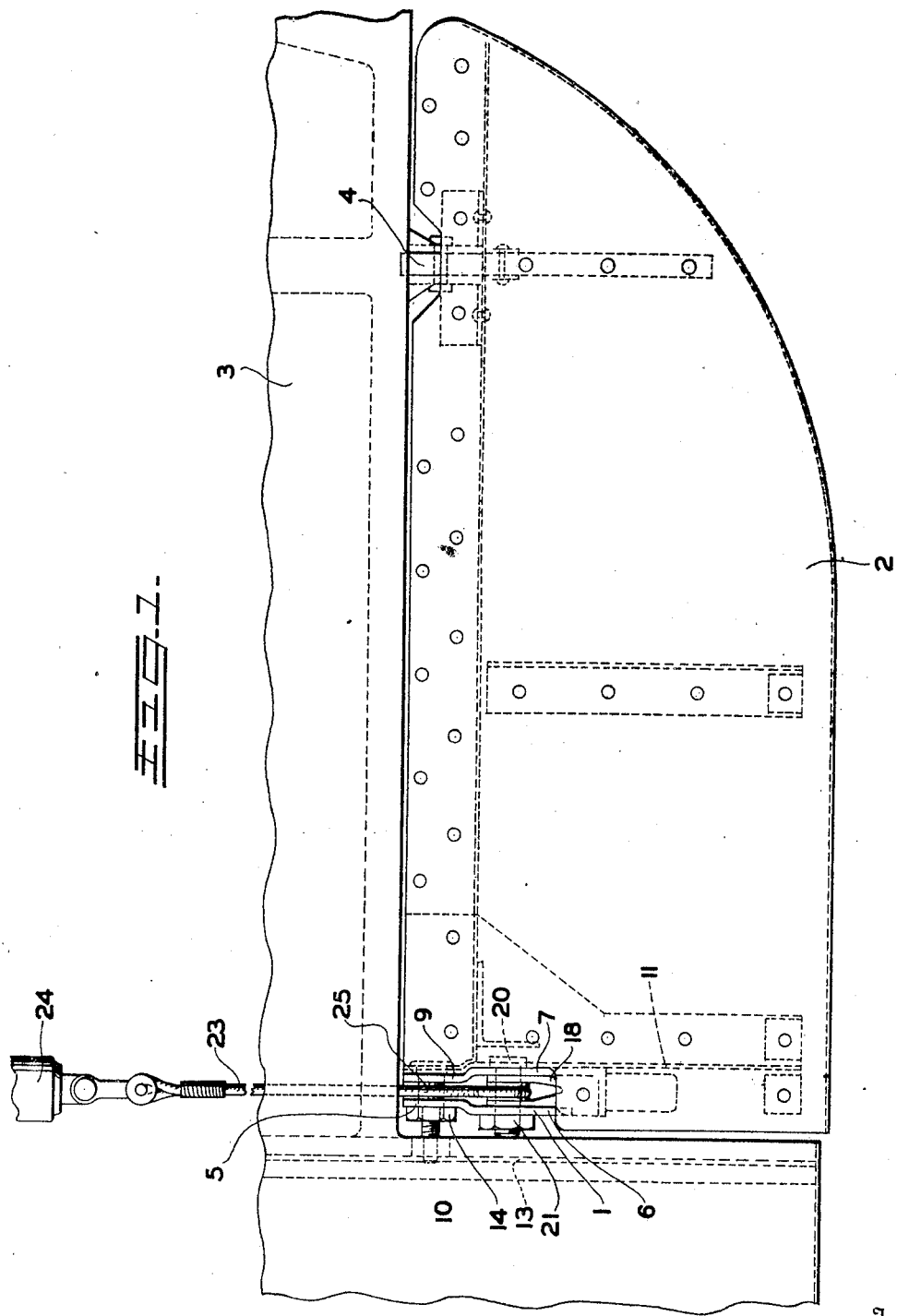
Inventors
FRANK M. SALISBURY
ROBERT H. DUFORT
By Semmes, Keegin, & Semmes
Attorneys

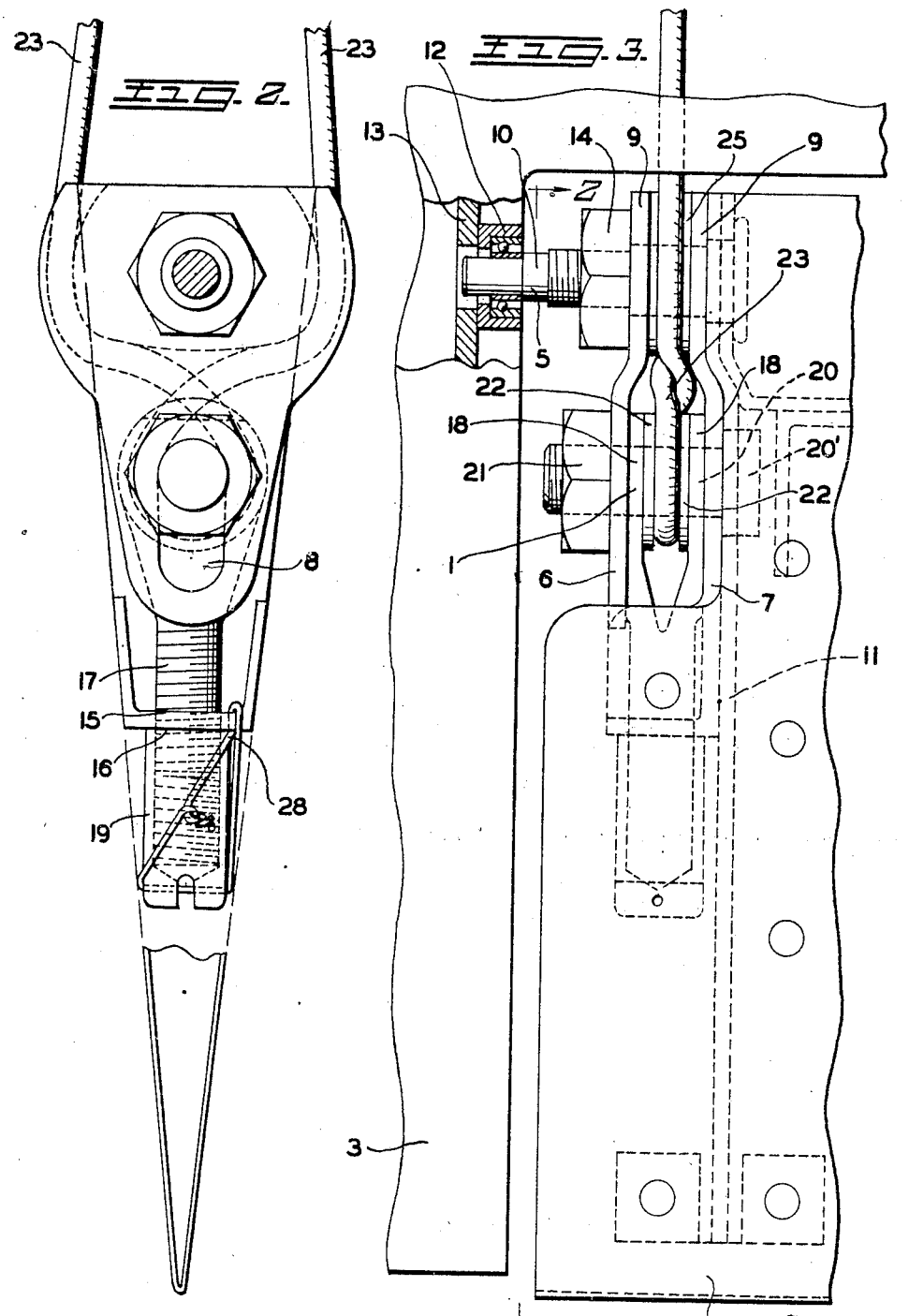

Patented Mar. 30, 1943

2,315,483

UNITED STATES PATENT OFFICE 2,315,483

ADJUSTING UNIT

Frank M. Salisbury and Robert H. Dufort, Kenmore, N. Y., assignors to Bell Aircraft Corporation, Buffalo, N. Y., a corporation of New York Application April 28, 1939, Serial No. 270,670

4 Claims. (Cl. 244—87)

This invention relates to an adjusting unit, and more particularly to a unit which is designed to adjust control surfaces of an airplane from without the control surface, thus eliminating the need of inspection openings.

In order to establish a central point for controlling an airplane, it is necessary to use control actuating means, which usually include cables to connect the central operating device within the fuselage of the plane to the several control surfaces. These cables are subject to stretch and the mechanisms to which they are connected are subject to wear. These factors cause a lessening of the tension of the cables which results in the pilot being unable to control the flutter for the control surface to which they are attached, and they may result in a differential of length in the cables operating a single control surface, thereby causing the control surfaces to assume a position below or above their normal neutral position when the central control unit in the fuselage is at a neutral setting.

One of the objects of this invention is to provide a means for applying an initial tension to control cables.

Another object of this invention is to provide a unit to increase the tension of cables which need adjustment due to stretch or wear.

Still another object of this invention is to provide a unit by means of which a differential of length in the control cables which operate a single control surface may be negated by adjusting the angular position of the control surface relative to the setting of the operating unit.

A further object of this invention is to provide a unit which will adjust the tension of operating cables and the angular position of the control surface from without the control surface, thus eliminating the need of inspection or adjusting openings.

With these and other objects in view, our invention consists of an adjustment unit which is an integral part of a control surface and provides adjustable means for operatively attaching an actuating cable to the control surface, such adjusting means being accessible from the exterior of the control surface. In one form of our invention, the unit consists of a clamp which engages the cable and holds it under tension and a screw which may vary the position of the clamp so as to increase or reduce the tension of the cable. If it is desired to change the angular position of the control surface relative to the cable, the clamp may be loosened so that the control surface may be freely moved about its hinge without disturbing a fixed position of the cable.

In the drawings:

Figure 1 is a top plan view of a trimming tab and a fragment of a control surface of an airplane disclosing the adjusting unit in operative position.

Figure 2 is a sectional view taken on the line 2—2 of Figure 1.

Figure 3 is an enlarged top plan view of a fragment of the control surface disclosing a detailed view of the adjusting unit.

For purposes of illustration we have disclosed in the drawings our adjusting unit, which is generally designated by the numeral 1, mounted within a trimming tab 2. The trimming tab 2 is pivotally mounted on a control surface 3 by means of hinges 4 and 5.

The adjusting unit 1, when assembled, is composed of a pair of substantially parallel plates 6 and 7 which extend from the hinge 5 rearwardly toward the trailing edge of the tab 2. Each of these plates are provided with longitudinally extending aligned slots 8 and aligned apertures 9. The forward extremities of each of the plates 6 and 7 are carried on a headed stub shaft 10 which extends through the aligned apertures 9. The headed extremity of the stub shaft 10 is carried by a member 11 which forms one of the chord members of the tab 2, and the other extremity of the shaft is journalled in bearings 12 which are mounted on a member 13 which forms a part of the structure of the control surface 3. This assembly forms the hinge 5. A portion of the stub shaft 10 is threaded to carry a nut 14.

The plate 7 is attached to the chord member 11 in any suitable manner, and its rearward extremity is flanged, as indicated at 15. The flange 15 is provided with an aperture 16 for the reception of the shank of an eye-bolt 17, the eye portion of which is bifurcated as shown at 18. A nut 19 is provided on the threaded shank of the eye bolt 17 and bears against the rear of the flange 15 to provide means for varying the position of the bifurcated eye portion 18.

A clinch bolt 20, which is provided with a nut 21 and washers 22, is adapted to be carried by the eye of the bolt 17 and also to pass through the aligned slots 8 in each of the plates 6 and 7. The head 20' of the bolt 20 bears against the outboard surface of the plate 7 and the nut 21 bears against the inboard surface of the plate 6.

An operating cable 23 which may be directly connected to the central control device in the fuselage of the plane or connected to an operating unit 24, such as disclosed in the co-pending application of Herbert L. Bowers, Serial No. 257,012, filed February 17, 1939, is looped over the bolt 20 between the washers 22 which are mounted within the bifurcation 18. This cable 23 is crossed and passed over and under a sleeve member 25 which is integral with the plate 7 and coaxial with the stub shaft 10.

In operation, the cable 23 can be placed under an initial tension by revolving the nut 19 in a manner which will cause the screw to draw the bolt 20 along the longitudinally extending slots 8 in a direction away from the stub shaft 10. When the proper tension has been obtained, the loop of the cable 23 is secured by tightening the nut 21. The nut 19 can then be secured against further rotation by means of a locking arrangement, such as shown at 28.

Should the neutral position of the tab be changed due to wear or unequal stretch in the operating cables, the nut 21 is loosened and the bolt 20 is moved towards the stub shaft 10 by the proper manipulation of the nut 19. After the above operation has been completed, the tab 2 is moved about its hinge until proper angular position has been restored. An initial tension can then be secured in the manner previously described and the cable again clamped between the washers 22.

If, on the other hand, the cable is stretched equally due to wear, it can be placed under additional tension merely by loosening the clinch nut 21 and operating the nut 19 in a direction which will draw the bolt 20 away from the stub shaft 10. When the proper tension has been obtained, the nut 21 is again tightened and the screw 17 secured by means of the locking device 28.

While for purposes of illustration we have shown our device mounted on a trimming tab, it is obvious that it can be used in connection with any of the control surfaces of an airplane both to maintain the proper neutral setting of the control surface and to maintain the initial tension of the control actuating means by proper adjustment. Moreover, various mechanical equivalents can be substituted without departing from the inventive concept of this invention.

It is, therefore, to be understood that we wish our invention to be limited only by the prior art and the scope of the appended claims.

We claim:

1. An adjusting device for an airplane control surface comprising a cable to actuate the control surface, a base mounted on the control surface, a pair of parallel slots formed in the base, a clamp movably mounted in said slots, said clamp being adapted to engage the said cable, a bolt movably mounted on the base, said bolt engaging the clamp, and means to move the bolt in a path parallel to the chord of the control surface thereby tightening the control cable.

2. An adjusting device for an airplane control surface comprising a cable to actuate the control surface, a cable engaging hinge, said control surface being pivotally mounted on said hinge, a base mounted on said control surface, a pair of parallel slots formed in the base, a clamp movably mounted in said slots, said clamp being adapted to engage the said cable, a bolt movably mounted on the said base, said bolt engaging the clamp, and means to move the bolt in a path perpendicular to the axis of the said hinge whereby the tension on the cable may be varied.

3. An adjusting device for an airplane control surface comprising a cable to actuate the control surface, a base mounted on said control surface, a pair of parallel slots formed in the base, a clamp movably mounted in said slots, said clamp being adapted to engage said cable, a threaded screw provided with bifurcated ends, the bifurcated ends engaging the said clamp and means to move the screw in a path parallel to a chord of the control surface whereby the tension on the cable may be varied.

4. An adjusting device for an airplane control surface comprising an operating member to actuate the control surface, a base rigidly mounted on said control surface, a clamp movably mounted on the base, said clamp being designed to fixedly engage said operating member, an extensible member mounted on the base and operatively attached to the clamp, and means to move the said extensible member in a path parallel to a chord of the control surface, the movement of said extensible member moving the said clamp in relation to the base in a path parallel to a chord of the control surface, whereby the tension on the said operating member is varied by the movement of the said extensible member.

FRANK M. SALISBURY.
ROBERT H. DUFORT.